(12) United States Patent
Dumont et al.

(10) Patent No.: US 7,935,386 B2
(45) Date of Patent: May 3, 2011

(54) AQUEOUS SILICONE EMULSION FOR COATING WOVEN OR NON-WOVEN FIBROUS SUBSTRATES

(75) Inventors: Laurent Dumont, La Motte Servolex (FR); Michel Feder, Villeurbanne (FR); Francis Lafaysse, Saint Genis Laval (FR); Sylvie Robelin, Lyons (FR)

(73) Assignee: Rhodia Chimie, Boulogne-Billancourt (FR)

( * ) Notice: Subject to any disclaimer, the term of this patent is extended or adjusted under 35 U.S.C. 154(b) by 565 days.

(21) Appl. No.: 12/068,128

(22) Filed: Feb. 1, 2008

(65) Prior Publication Data

US 2008/0207827 A1 Aug. 28, 2008

Related U.S. Application Data

(63) Continuation of application No. 10/518,401, filed as application No. PCT/FR03/01835 on Jun. 17, 2003, now abandoned.

(30) Foreign Application Priority Data

Jun. 18, 2002 (FR) ..................... 02 07498

(51) Int. Cl.
*D06M 15/643* (2006.01)
(52) U.S. Cl. ....... 427/387; 252/8.61; 428/447; 525/477; 525/478; 528/15; 528/31; 528/32
(58) Field of Classification Search .......... None
See application file for complete search history.

(56) References Cited

U.S. PATENT DOCUMENTS

| | | | | |
|---|---|---|---|---|
| 4,163,082 A | 7/1979 | Romenesko | .............. | 428/447 |
| 4,508,606 A | 4/1985 | Andrade et al. | .............. | 204/169 |
| 4,791,029 A | 12/1988 | Fau et al. | .............. | 428/447 |
| 4,874,671 A | 10/1989 | Tahara et al. | .............. | 428/447 |
| 5,147,397 A | 9/1992 | Christ et al. | .............. | 623/6 |
| 5,364,662 A | 11/1994 | Domenico et al. | .............. | 427/536 |
| 5,399,402 A | 3/1995 | Inoue et al. | .............. | 428/35.7 |
| 5,506,302 A | 4/1996 | Shiono et al. | .............. | 524/731 |
| 5,827,921 A | 10/1998 | Osawa et al. | .............. | 524/837 |
| 5,998,536 A | 12/1999 | Bertry et al. | .............. | 524/557 |
| 6,265,690 B1 | 7/2001 | Försnel et al. | .............. | 219/121.5 |
| 7,198,854 B2 | 4/2007 | Dumont et al. | .............. | 428/447 |
| 2002/0012756 A1 | 1/2002 | Kuckertz et al. | .............. | 427/569 |
| 2002/0061365 A1 | 5/2002 | Grape et al. | .............. | 427/387 |
| 2003/0149166 A1 | 8/2003 | Duffy et al. | .............. | 524/588 |
| 2006/0046077 A1 | 3/2006 | Howe et al. | .............. | 428/447 |
| 2006/0157453 A1 | 7/2006 | Dumont et al. | .............. | 219/121.5 |

FOREIGN PATENT DOCUMENTS

| | | |
|---|---|---|
| DE | 199 46 252 | 4/2001 |
| EP | 0 431 979 | 6/1991 |
| EP | 0 647 477 | 4/1995 |
| EP | 0 702 068 | 3/1996 |
| EP | 0 712 956 | 5/1996 |
| EP | 0 819 735 | 1/1998 |
| EP | 0 659 857 | 4/1998 |
| EP | 0 866 164 | 9/1998 |
| EP | 0 643 106 | 12/1999 |
| EP | 1 078 823 | 2/2001 |
| FR | 2 617 760 | 1/1989 |
| GB | 2 045 824 | 11/1980 |
| JP | 03-122185 | 5/1991 |
| JP | 10-025698 | 1/1998 |
| WO | WO 95/19394 | 7/1995 |
| WO | WO 01/78891 | 10/2001 |

OTHER PUBLICATIONS

Freeman, Silicones, *An Introduction to Their Chemistry and Applications*, p. 27 (1962).

*Primary Examiner* — Marc S Zimmer
(74) *Attorney, Agent, or Firm* — James C. Lydon (57) ABSTRACT

An aqueous polyorganosiloxane (POS) emulsion which can easily be deposited on/applied to a fibrous substrate at high speed and at limited deposition rates, for example less than 40 g/m$^2$. The emulsion contains (A) a POS with ≡Si-vinyl units, (B) a POS with ≡SiH units, (C) an adhesion promoter, (D) a catalyst, (E) at least one surfactant, (F) optionally a POS resin with ≡Si-vinyl units, (G) optionally a crosslinking inhibitor, (H) optionally a pH fixing agent, (I) optionally a formulating additive, (J) optionally a filler, and (K) water. Adhesion promoter (C) is selected from protective hydrocolloids, hydroxylated silanes and/or POS carrying at least one hydroxyl group and at least one salified amino group per molecule, and mixtures thereof, and is present in the range from 0.005 to 10% by weight, based on the silicone phase. Also disclosed is the corresponding coating process and the coated substrate.

18 Claims, 1 Drawing Sheet

AQUEOUS SILICONE EMULSION FOR COATING WOVEN OR NON-WOVEN FIBROUS SUBSTRATES

This application is a continuation of U.S. application Ser. No. 10/518,401, filed Sep. 30, 2005 now abandoned, which is the National Stage of International Application No. PCT/FR03/01835, filed Jun. 17, 2003.

The present invention relates to an aqueous emulsion of polyorganosiloxane (POS), especially for coating woven (textile) or non-woven substrates, which is intended to produce an elastomer after crosslinking in a thin layer, to a corresponding coating process and to the coated substrates.

The role of silicone coatings is especially that of binders for improving the mechanical properties of fibrous substrates and notably the tear strength, the fraying resistance, the flexibility or the crumpling ability.

Silicone coatings can also contribute towards giving fibrous substrates a degree of impermeability and a water-repellent character.

In the case of flame-retardant (woven or non-woven) fibrous substrates such as glass fabrics or nonwovens, it is important that these silicone coatings do not adversely affect the combustion resistance or, more especially, the calorific value of such substrates.

Apart from protecting textile materials against heat and fire, silicone coatings can also provide them with protection against other aggressions and/or give them specific properties for certain applications (e.g. dielectric properties). Applications which may be mentioned in particular are inflatable bags used for protecting vehicle occupants, or airbags, glass braiding (glass fabric sheathing for the thermal and dielectric protection of electric wire), conveyor belts, fire-resistant fabrics or thermal insulators, compensators (leaktight flexible sleeves for piping), clothing, or flexible materials for use in interior or exterior textile architecture (tarpaulins, tents, stalls, marquees, false ceilings, etc.) or solar protection.

There are several important technical problems associated with the production of elastomer coatings on fibrous substrates.

A first problem relates to the operation involving deposition/impregnation of the non-crosslinked silicone composition on the substrate. It is important that this operation can be carried out easily, rapidly (industrial rate) and, for obvious economic reasons, at reduced deposition rates (e.g. less than 40 microns).

A second problem lies in the minimum level of adhesion which the silicone coating must have on the substrate.

A third problem results from the ambition to improve the performance characteristics of the silicone elastomer coating from the point of view of its mechanical properties, its protective function and its hydrophobic and impermeabilizing properties, without adversely affecting the flame-retardant qualities of certain textile substrates such as glass fabrics.

Consideration of the first of the above-mentioned problems has led those skilled in the art to liquid silicone compositions of the aqueous silicone emulsion type, with or without a filler. It has yet to be discovered whether these emulsions provide a correct solution to the second and third of the problems referred to above.

European patent application EP-A-0 535 649 proposes a composition for coating inflatable bags, or airbags, comprising:

a polyorganosiloxane (A) of the POS type, e.g. α,ω-dimethylhydroxy-siloxy PDMS, as an emulsion in water in the presence of an anionic emulsifier, an adhesion promoter (B) selected from the group comprising the reaction product of on the one hand an aminofunctional silane or a hydrolyzate thereof, and on the other hand an acid anhydride, an epoxy-functional silane or a hydrolyzate thereof, and/or an organosilane having an isocyanate radical and a hydrolyzable radical, or a hydrolyzate thereof (for example 3-aminopropyltriethoxysilane+maleic anhydride), a colloidal silica (C), and a catalyst (D).

This emulsion suffers from the following disadvantages: an inadequate compromise in terms of adhesion, reactivity and stability of the emulsions, particularly an inadequate adhesion of the silicone to the substrate, and an incompatibility of the silanes and surfactant used with polyaddition systems based on oils containing ≡SiH and on platinum catalyst.

Likewise, European patent application EP-A-0 552 983 describes a composition of the same type obtained from (A) an organopolysiloxane having at least two alkenyl groups [alpha,omega-dimethylvinylsiloxypoly(dimethyl)(vinylmethyl)siloxane], (B) an organohydrogenopolysiloxane [alpha,omega-trimethylsiloxypoly(methylhydrogeno)siloxane] having at least three hydrogen atoms, (C) a platinum crosslinking catalyst, (D) a crosslinking inhibitor of the ethynylcyclohexanol type, (E) an adhesion promoter of the epoxidized trialkoxysilane or amino-functional silane type (p. 4, line 34) and (F) optionally a reinforcing filler such as a colloidal silica, by emulsification in water in the presence of an emulsifier (dodecylbenzenesulfonate and polyvinyl alcohol, PVA).

This emulsion suffers from the following disadvantages: an inadequate compromise between adhesion (to the substrate) and stability (of the emulsion); in particular, the use of dodecylbenzenesulfonate and non-salified amino-functional silane results in a limited stability of polyaddition emulsions.

European patent EP-B-0 758 666 relates to aqueous emulsions comprising:

1—POS of the polydimethylsiloxane (PDMS) type vinylated at the end of the chain (vinyldimethylsiloxy);
2—hydrogenated POS of the α,ω-trimethylsiloxypoly(methylhydrogeno)(dimethyl)siloxane type;
3—a platinum catalyst of the Karstedt platinum type;
4—an adhesion promoter produced by reacting a vinyltriacetoxysilane and a trimethoxysilane functionalized with a glycidyl radical;
5—a crosslinking inhibitor of the ethynylcyclohexanol type;
6—a silicone resin of the type MT, where M=(Me$_3$SiO$_{1/2}$) and T=(MeSiO$_{3/2}$);
7—an emulsifier of the sodium dodecylbenzenesulfonate type.

This polyaddition silicone solution is preferentially applied in the production of textile coatings (airbag: polyamide substrate).

European patent application EP-A-1 010 721 relates to the same emulsion as that described in EP-B-0 758 666 except that it has a further additive consisting of carbon black.

Patent application FR-A-2 738 830 relates to an aqueous polyorganosiloxane emulsion for coating textile material. This emulsion is obtained by mixing an emulsion A and an emulsion B.

Emulsion A comprises:

1—POS oil of the α,ω-dimethylvinylsiloxy PDMS type;
2—a hydrogenated POS oil of the α,ω-dimethylhydrogenosiloxy PDMS type;

3—a hydrogenated POS silicone oil of the poly(dimethyl)(methylhydrogeno)siloxane type;
4—an adhesion promoter of the following types: vinyltrimethoxysilane, 3-glycidoxypropyltrimethoxysilane (GLYMO), 4-epoxycyclohexylethyltrimethoxysilane, chelates of the butyl orthotitanate type or, finally, in the case of silicone compositions crosslinkable by polyaddition, aminosilanes of the amino-functional trimethoxysilane or triethoxysilane type;
5—a crosslinking inhibitor of the ethynylcyclohexanol type;
6—and fillers=colloidal silica hydrophobized in silicone oil.

Emulsion B comprises:
1'—α,ω-divinylated POS oil identical to that of emulsion A;
4'—an adhesion promoter of the butyl titanate type;
7—a platinum catalyst;
6'—colloidal filler of the same type as in emulsion A.

Emulsions A and B are prepared by mixing (without emulsifying) on the one hand components 1 to 6 and on the other hand components 1', 4', 7 and 6', respectively, and then emulsifying the compositions described above by agitating them in the presence of water and polyvinyl alcohol (PVA Rhodoviol® 25/140). Once they have been obtained separately, emulsions A and B are mixed with one another.

This aqueous silicone emulsion additionally has the following disadvantages: very coarse emulsions are produced, the process is rather inflexible and burdensome because intermediate silicone mixtures have to be produced, and it is difficult to prepare very concentrated emulsions.

Given this state of the art, one of the essential objects of the present invention is to provide a silicone emulsion, crosslinkable by polyaddition, for coating woven or non-woven fibrous substrates, said emulsion possessing rheological properties such that it can easily be deposited on/applied to the fibrous substrate at high speed and at limited deposition rates, for example of less than 40 g/m$^2$.

Another essential object of the invention is to provide an aqueous silicone emulsion, crosslinkable by polyaddition, for forming protective thin coatings (thin layers) on woven (textile) or non-woven fibrous substrates, the composition of this emulsion being such as to optimize the adhesion of the crosslinked silicone elastomer film to the substrate.

Another essential object of the invention is to provide an aqueous silicone emulsion, crosslinkable by polyaddition, for coating woven or non-woven fibrous substrates, the composition of this emulsion being such as to produce a crosslinked silicone elastomer coating capable of giving the substrate excellent mechanical qualities (cohesion, flexibility, fraying resistance, tear strength, crumpling ability).

Another essential object of the invention is to provide an aqueous silicone emulsion that crosslinks by polyaddition to give an elastomer coating for a woven or non-woven fibrous substrate, the composition of this emulsion being such as to satisfy the specifications of easy deposition in a limited amount, adhesion to the substrate, and mechanical quality.

Another essential object of the invention is to provide an aqueous silicone emulsion, crosslinkable by polyaddition, for forming, on mineral fibrous substrates of low adhesiveness (particularly textile or non-textile glass fiber substrates), silicone coatings that adhere to the fibers but give them anti-adhesion, hydrophobic and impermeable properties and satisfy the specifications of easy deposition in a limited amount, adhesion to substrates, mechanical properties (flexibility/tear strength and fraying resistance) and incombustibility corresponding to a gross calorific value (GCV), measured according to NFP 92510, below 4200 kJ/kg and preferably below 2500 kJ/kg.

Another essential object of the invention is to provide an aqueous silicone emulsion that crosslinks by polyaddition, on woven or non-woven fibrous substrates, to give protective, impermeable, flame-retardant, flexible, strong and optionally flame-retardant elastomer coatings, the composition of this emulsion being such that, in the case of glass fiber substrates, the elastomer film is a good binder capable of giving the coated glass substrates stability, cohesion and flexibility, while at the same time minimizing the phenomenon of creasing.

Another essential object of the invention is to produce emulsions that are chemically stable (preservation of the ≡SiH and the reactivity) and physically stable (limited creaming and coalescence during storage of the emulsion) and have good characteristics in terms of reactivity (crosslinking by polyaddition) and adhesion to the substrate, by drying the treated fabric.

These and other objects are achieved by the present invention, which relates first and foremost to an aqueous polyorganosiloxane (POS) emulsion, crosslinkable to an elastomer by means of polyaddition reactions, for impregnating woven or non-woven fibrous substrates, said emulsion comprising:
(A) at least one POS having at least two unsaturated functional groups of the $C_2$-$C_6$ alkenyl type bonded to the silicon in each molecule,
(B) at least one POS having at least three hydrogen atoms bonded to the silicon in each molecule,
(C) at least one special adhesion promoter,
(D) at least one catalyst,
(E) at least one surfactant,
(F) optionally at least one POS resin containing at least two alkenyl groups,
(G) optionally at least one crosslinking inhibitor,
(H) optionally at least one pH fixing agent,
(I) optionally at least one formulating additive,
(J) optionally a filler,
(K) and water,
characterized in that:
the adhesion promoter (C) is selected from the group of compounds comprising protective hydrocolloids, hydroxylated silanes and/or POS carrying at least one hydroxyl group and at least one salified amino group per molecule, and mixtures thereof,
the percentage by weight of the adhesion promoter (C), based on the silicone phase, is such that:

|  |  |
| --- | --- |
|  | $0.005 \leq (C) \leq 10$ |
| preferably | $0.03 \leq (C) < 5$ |
| and particularly preferably | $0.05 \leq (C) \leq 4.0$ | with the proviso that, when the emulsion comprises at least one protective hydrocolloid, it is obtained by:
directly preparing at least one pre-emulsion that is non-catalyzing, i.e. devoid of catalyst (D), and at least one pre-emulsion that is catalyzing, i.e. contains catalyst (D), at least one of these pre-emulsions being obtained by bringing at least part of the silicone phase and at least part of the protective hydrocolloid into contact with water,
and then mixing the catalyzing emulsion(s) with the non-catalyzing pre-emulsion(s) when the impregnating bath is made up.

According to one particular characteristic of the invention, the emulsion is devoid of:
- substantially linear, vinylated polydiorganosiloxane copolymer(s) of the random type, blocked at each end of its polymer chain by vinyldiorganosiloxy or triorganosiloxy groups and containing at least three SiVi groups per molecule,
- and/or vinylated cyclotrisiloxane(s) of the formula [R(CH$_2$=CH)SiO]$_3$, in which R is a C$_1$-C$_4$ alkyl radical, a phenyl radical or a 3,3,3-trifluoropropyl radical, this vinylated cyclotrisiloxane being present in an amount such that 0.5 to 60% and preferably 1.5 to 20% of the number of vinyl groups in the emulsion consist of the vinyls of this vinylated cyclotrisiloxane,
- and/or sodium laurylsulfate.

Preferably, the ratio amount by weight of adhesion promoter (C)/surface area developed by the substrate ranges from 0.1 to 10 mg/m$^2$ and preferably from 0.2 to 5 mg/m$^2$.

"Surface area developed by the substrate" is understood according to the invention as meaning the surface area developed by the fibers that constitute the fabric and are to be covered with the emulsion.

The aqueous silicone emulsion according to the invention is of the type that crosslinks by polyaddition at room temperature (EVF or RTV), it being known that this platinum-catalyzed crosslinking can be thermally activated (100-200° C.).

This aqueous silicone emulsion according to the invention adheres to numerous woven or non-woven fibrous substrates, for example made of glass fibers or optionally of synthetic textile fibers of the polyester or polyamide type.

As regards fibrous substrates of the glass fabric type, the emulsion according to the invention makes it possible to obtain glass fabrics coated with thin layers of silicone elastomers that are hydrophobic and have good mechanical properties of flexibility, tear strength and fraying resistance and do not release much heat on combustion: GCV≦4500 kJ/kg, preferably GCV≦2500 kJ/kg.

One of the essential constituents of the emulsion according to the invention is the special adhesion promoter (C), which is carefully selected so that the adhesion is provided by:
- at least one protective hydrocolloid, preferably PVA, which can also act as a surfactant (E), either on its own or in combination with other emulsifiers,
- or specific, carefully selected silanes and/or POS, namely silanes and/or POS with hydroxyl and salified amino units,
- or a protective hydrocolloid, preferably PVA, and silanes and/or POS with hydroxyl and salified amino units.

In a first embodiment of the invention, the protective hydrocolloid used, preferably PVA, is exclusively dedicated to the function of adhesion promoter (C).

In a second embodiment of the invention, the surfactant (E) can consist at least in part of at least one protective hydrocolloid, preferably a PVA.

In the first embodiment, the protective colloid, preferably PVA, is present in a reduced amount in the emulsion so that it can only fully exert its function of adhesion promoter (C) and imperfectly its function of emulsifier. Consequently, the emulsion has to comprise a main emulsifier or surfactant (E).

In the second embodiment of the invention, the protective colloid, preferably PVA, as adhesion promoter and emulsifier, is present in an amount of 1.5 to 7% of dry PVA, based on the total weight of silicone oils.

From the qualitative point of view, it may be indicated that the protective hydrocolloid is preferably a polyvinyl alcohol (PVA) or a mixture of PVA, preferably PVA grades which, in aqueous solution (at 4% and at 20° C.), have a standard dynamic viscosity ($\eta_{sd}$) of between 5 and 40 mPa·s and preferably of between 10 and 30 mPa·s, and an ester number greater than or equal to 80, preferably greater than or equal to 100 and especially of between 120 and 200.

Preferably, the PVA is used in the form of an aqueous solution with a standard dynamic viscosity ($\eta_{sd}$) of between 5 and 40 mPa·s and preferably of between 10 and 30 mPa·s, and an ester number greater than or equal to 80, preferably greater than or equal to 100 and especially of between 120 and 200.

Polyvinyl alcohols (PVA) are compounds obtained indirectly from their esters by hydrolysis in an aqueous medium or by alcoholysis in an anhydrous medium. In practice, the esters used as starting materials are commonly polyvinyl acetates. Generally, lysis of the esters to give the PVA is not complete. Acyl radicals remain in the molecule and their proportion influences the properties of the PVA, especially its solubility. One method of defining PVA is therefore based on an indication of the ester number (EN), which is inversely proportional to the degree of hydrolysis. The EN is measured in a manner known per se by neutralizing any acidity in the polyvinyl alcohol, saponifing the acyl groups and titrating the excess alkalinity.

The polyvinyl alcohols according to the invention are also characterized by their degree of condensation, which can be evaluated by determining the dynamic viscosity of a standard solution (designated by $\eta_{sd}$ in the present disclosure), in the knowledge that this variable increases with the degree of condensation.

The viscosity $\eta_{sd}$ corresponds to the coefficient of dynamic viscosity of a 4% by weight aqueous solution of PVA, measured at a temperature of 20±5° C. using an Ostwald viscometer.

Other protective hydrocolloids which may also be mentioned are water-dispersible sulfonated polyesters, especially of the sulfonated polyethylene terephthalate type.

Water-dispersible sulfonated polyesters are known and commercially available products. They can be prepared by co-condensing an organic diacid (such as a saturated or unsaturated aliphatic diacid, an aromatic diacid, a diacid having several aromatic rings, an arylaliphatic diacid), one of its diesters or its anhydride and a sulfonated organic diacid or one of its diesters with a diol in the presence of a customary polyesterification catalyst such as tetraisopropyl orthotitanate.

The following may be mentioned as starting monomers commonly used for the preparation of water-dispersible sulfonated polyesters:
- as organic diacids: saturated or unsaturated aliphatic diacids and aromatic diacids, such as succinic, adipic, suberic and sebacic acids, maleic, fumaric and itaconic acids and orthophthalic, isophthalic and terephthalic acids, the anhydrides of these acids, and their diesters such as the dimethyl, diethyl, dipropyl and dibutyl esters, the preferred compounds being adipic acid and orthophthalic, isophthalic and terephthalic acids;
- as sulfonated organic diacids: sodium diacid sulfonates or their diesters such as dialkylisophthalates and dialkylsulfosuccinates like sodium dimethylisophthalate-5-sulfonate or sodium dimethylsulfosuccinate;
- as diols: aliphatic glycols such as ethylene glycol, diethylene glycol, dipropylene glycol and higher homologs, butane-1,4-diol, hexane-1,6-diol, neopentyl glycol, and cycloalkane glycols such as cyclohexanediol and dicyclohexanediolpropane, the preferably chosen diols being ethylene glycol and diethylene glycol.

The preferred water-dispersible sulfonated polyesters are those having a number-average molecular weight of between 10,000 and 35,000, an acid number below 5 mg KOH/g and a sulfur content of between 0.8 and 2% by weight and preferably of between 1.2 and 1.8%. Polyesters of this type which can be used in particular are the products marketed by RHODIA under the mark GEROL PS20.

The silanes with hydroxyl and salified amino units which can be constituent components of the promoter (C) are obtained from non-salified precursors; examples of these which may be mentioned are monoaminotrihydroxymonosilanes such as $NH_2(CH_2)_3—Si(OH)_3$ optionally oligomerized by partial condensation of the SiOH groups.

This having been stated, the water-soluble adhesion promoter (C) preferably comprises POS with hydroxyl and salified amino units.

These salified amino-POS constituting the promoter (C) are advantageously formed of several repeat units of average formula (I) below:

(I)

in which:
R¹ is a monovalent group devoid of nitrogen whose nature is identical or different from one repeat unit to the next and which is a $C_1$-$C_6$ alkyl, an aryl, a $C_2$-$C_8$ alkenyl or an acrylate, each of these groups optionally being substituted;
R² is of an identical or different nature from one repeat unit to the next and has the following formula:

R⁴ being an optionally substituted $C_1$-$C_{10}$ hydrocarbon radical,
the groups R⁵ and R⁶ being identical or different and representing hydrogen, an optionally substituted $C_1$-$C_{10}$ hydrocarbon radical or —R⁴—$NH_3^{(+)}.X^{(-)}$,
or the groups R⁵ and R⁶ being different from hydrogen and together forming a 5- to 7-membered ring containing at least one heteroatom, preferably nitrogen or oxygen,
and X being a counteranion selected from carboxylates and halides;
x, y and z are positive integers or decimal numbers below 4; and x+y+z<4.

Preferably, the salified amino-POS is a resin having a mean silicon functionality greater than 2, corresponding to x+y<2:
x preferably being <2 and, particularly preferably, $0.1 \leq x \leq 1$;
y preferably being <1.2 and, particularly preferably, $0.1 \leq y \leq 1.1$.

This corresponds to a POS resin which:
on the one hand is hydroxylated and comprises siloxy units T and optionally M and/or D and/or Q, or siloxy units Q and M and/or D and/or T;
and on the other hand carries at least one salified amino unit.

The siloxy units M, D, T and Q of the POS (C) are defined as follows:
unit M=$R_3SiO_{1/2}$
unit D=$R_2SiO_{2/2}$
unit T=$RSiO_{3/2}$
unit Q=$SiO_{4/2}$ The radicals R are identical or different and correspond to:
a radical R¹ as defined above, such as an alkyl radical (e.g. methyl, ethyl, isopropyl, tert-butyl, n-hexyl), a hydroxyl or an alkenyl (e.g. vinyl, allyl),
or a unit R² with a salifiable or salified amino unit, as defined above.

An example which may be mentioned of a linear hydroxylated POS resin which can be used as promoter (C) is polymethylsiloxane of which both ends carry a hydroxyl and in which each silicon atom carries a salifiable or salified amino unit.

The resins selected more particularly are those of the type T(OH), DT(OH), DQ(OH), DT(OH), MQ(OH), MDT(OH) or MDQ(OH) or mixtures thereof. Each OH group in these resins is carried by a silicon atom belonging to a unit D, T or Q.

These resins are products resulting from the condensation (mono-condensation or polycondensation, heterocondensation or homocondensation) of POS monomers, oligomers or polymers carrying condensable groups, preferably of a hydroxyl nature.

Apart from these hydroxyls, the promoter (C) carries one or more salifiable or salified amino units that are identical to or different from one another.

In these units the amine can be primary, secondary or tertiary. In variants the amine can be included in a ring or in isocyanurate groups or HALS groups (of the piperidine type or another type).

In terms of the invention the HALS groups can be defined as a cyclic hydrocarbon chain (HALS) of the formula in which:
the radicals R⁷, which are identical to or different from one another, are selected from linear or branched alkyl radicals having from 1 to 3 carbon atoms, and phenyl and benzyl radicals;
R⁸ is selected from a hydrogen atom, linear or branched alkyl radicals having from 1 to 12 carbon atoms, alkylcarbonyl radicals in which the alkyl radical is a linear or branched radical having from 1 to 18 carbon atoms, phenyl and benzyl radicals and a radical O;
t is a number selected from 0 and 1;
the radicals R⁷ preferably being methyls, the radical R⁸ preferably being a hydrogen atom or a methyl radical and t advantageously being a number equal to 1.

The salifiable or salified amino units are advantageously selected so as to be capable of binding to the substrate to which the emulsion is applied, in order to provide adhesion, without adversely affecting the solubility in water that is desirable for the promoter (C).

For further details on these promoters (C) of the water-soluble silicone resin type with hydroxyl and salifiable or salified amino units, and on their preparation, reference may be made to patent FR-B-2 753 708 or European patent application EP-A-0 675 128, the contents of which form an integral part of the present disclosure by reference.

Specific examples of salifiable amino units which may be mentioned in particular are:

aminopropyl: $(H_2N)(CH_2)_3—$
N-methyl-3-aminopropyl: $(H_3CNH)(CH_2)_3—$
N-aminoethyl-3-aminopropyl: $(H_2N)(CH_2)_2NH(CH_2)_3—$
$C_6H_5CH_2NH(CH_2)_2(NH)(CH_2)_3—$
3-ureidopropyl: $(H_2NCONH)(CH_2)_3—$
3-(4,5-dihydroimidazol-1-yl)propyl:

Optionally, the promoter containing salifiable amino units can also carry non-aminated groups such as the following:

3-methacryloxypropyl: $(H_2C=C)(CH_3)(COO)(CH_2)_3—$
3-glycidyloxypropyl:

3-mercaptopropyl: $(HS)(CH_2)_3—$
3-chloropropyl: $(Cl)(CH_2)_3—$
vinyl: $CH_2=CH—$ it being possible for these units to be incorporated by techniques known to those skilled in the art, especially by the co-hydrolysis/co-condensation of an aminated alkoxysilane with a non-aminated alkoxysilane carrying the units described above.

It is also possible to add the alkoxysilanes carrying the non-aminated units to the emulsion containing the salified aminosilane.

One of the essential characteristics of the promoter (C) selected according to the invention is to be salified via the amino units as described above, which comprise at least one $≡N^+.X^-$, where X is a counteranion selected from carboxylates and halides, preferably a lactate, an acetate or a chloride.

For the promoter (C) to be salified, it is necessary to ensure that the aqueous continuous phase of the dispersion has a pH such that said promoter (C) (preferably a hydroxylated POS resin) is maintained in ionized form. The pH is chosen, in a manner known per se, according to the pKa of the acid corresponding to the counteranion used.

The preferred promoter (C) in the form of a hydroxylated resin is included in the aqueous continuous phase of the dispersion, being solubilized or finely dispersed therein.

In one variant it is possible to envisage that only part of the promoter (C) is in salified form, the remainder being unsalified.

The invention also covers mixtures of promoters (C) of different natures.

The silicone phase of the emulsion according to the invention comprises POS for generating the elastomer by crosslinking/curing at room temperature (23° C.) according to a polyaddition mechanism. It is possible to accelerate the crosslinking by thermal activation at a temperature above room temperature. Elastomers that vulcanize in the cold by polyaddition and elastomers that vulcanize under the action of heat by polyaddition fall within the framework of the invention.

In terms of the invention, the words "silicone phase" are to be understood as meaning "non-aqueous phase" in the emulsion.

These polyorganosiloxanes, which are the main constituents of the compositions according to the invention, can be linear, branched or crosslinked and can contain hydrocarbon radicals and/or reactive groups such as hydroxyl groups, hydrolyzable groups, alkenyl groups, hydrogen atoms, etc. It should be pointed out that organopolysiloxane compositions are amply described in the literature and especially in the work by Walter NOLL entitled "Chemistry and Technology of Silicones", Academic Press, 1968, 2nd edition, pages 386 to 409.

More precisely, the POS which are the main constituents of the compositions according to the invention consist of siloxy units of the general formula $$R^9_n SiO_{\frac{4-n}{2}} \quad (II)$$

and/or siloxy units of the formula $$Z_n R^9_y SiO_{\frac{4-x-y}{2}} \quad (III)$$

In these formulae the various symbols are defined as follows:

the symbols $R^9$, which are identical or different, are each a non-hydrolyzable hydrocarbon group, it being possible for this radical to be:
an alkyl or halogenoalkyl radical having from 1 to 5 carbon atoms and containing from 1 to 6 chlorine and/or fluorine atoms,
cycloalkyl and halogenocycloalkyl radicals having from 3 to 8 carbon atoms and containing from 1 to 4 chlorine and/or fluorine atoms,
aryl, alkylaryl and halogenoaryl radicals having from 6 to 8 carbon atoms and containing from 1 to 4 chlorine and/or fluorine atoms,
cyanoalkyl radicals having 3 or 4 carbon atoms;
the symbols Z, which are identical or different, are each a hydrogen atom or an alkenyl group;
n=an integer equal to 0, 1, 2 or 3;
x=an integer equal to 0, 1, 2 or 3;
y=an integer equal to 0, 1 or 2;
the sum x+y is between 1 and 3.

By way of illustration, the following groups may be mentioned as organic radicals $R^9$ directly bonded to silicon atoms: methyl; ethyl; propyl; isopropyl; butyl; isobutyl; n-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,4,4,5,5-hexafluoropentyl; β-cyanoethyl; β-cyanopropyl; phenyl; p-chlorophenyl; m-chloro-phenyl; 3,5-dichlorophenyl; trichlorophenyl; tetrachlorophenyl; o-, p- or m-tolyl; α,α,α-trifluorotolyl; and xylyls such as 2,3-dimethylphenyl and 3,4-dimethylphenyl.

Preferably, the organic radicals $R^9$ bonded to silicon atoms are methyl or phenyl radicals, it optionally being possible for these radicals to be halogenated, or cyanoalkyl radicals.

The symbols Z can be hydrogen atoms or vinyl groups.

It is possible to use a wide variety of two-component or one-component organopolysiloxane compositions that crosslink at room temperature or under the action of heat by means of polyaddition reactions, essentially by the reaction of hydrogenosilyl groups with alkenylsilyl groups, generally in the presence of a metal catalyst preferably based on platinum, said compositions being described e.g. in patents U.S. Pat. Nos. 3,220,972, 3,284,406, 3,436,366, 3,697,473 and 4,340, 709. The organopolysiloxanes forming part of these compositions generally consist of pairs based on the one hand on at least one linear, branched or crosslinked polysiloxane consisting of units (III) in which the radical Z is an alkenyl group and x is equal to at least 1, optionally in association with units (II), and on the other hand on at least one linear, branched or crosslinked hydrogenopolysiloxane consisting of units (III) in which the radical Z this time is a hydrogen atom and x is equal to at least 1, optionally in association with units (II).

As regards the unsaturated polysiloxane constituent containing units (III), this can be an oil having a dynamic viscosity at 25° C. of between 200 and 500,000 mPa·s. A mixture based on the above-mentioned oil and an unsaturated gum having a viscosity greater than 500,000 mPa·s and capable of ranging up to $10^6$ mPa·s can also be used, if required, as the unsaturated polysiloxane constituent containing units (III).

Preferably, in the case of polyaddition compositions, the emulsions according to the invention also contain at least one non-hydroxylated silicone resin (F). These silicone resins are well-known branched POS polymers that are available commercially. In each molecule they have at least two different units selected from those of the formulae $R^{10}_3SiO_{1/2}$ (unit M), $R^{10}_2SiO_{2/2}$ (unit D), $R^{10}SiO_{3/2}$ (unit T) and $SiO_{4/2}$ (unit Q).

The radicals R are identical or different and are selected from linear or branched alkyl radicals, vinyl radicals, phenyl radicals and 3,3,3-trifluoropropyl radicals. The alkyl radicals preferably have from 1 to 6 carbon atoms inclusive. Alkyl radicals R which may be mentioned more particularly are methyl, ethyl, isopropyl, tert-butyl and n-hexyl radicals.

Advantageously, in emulsions of the polyaddition type, at least some of the radicals $R^{10}$ are vinyl radicals (Vi content especially between 0.1 and 2% by weight). These vinyl groups are carried by the units M, D or T. Examples which may be mentioned are vinylated resins MDQ, such as $MD^{Vi}Q$, or resins $MM^{Vi}Q$.

As regards the surfactants (E) other than the protective hydrocolloid (PVA), these can be anionic [except in the case where the emulsion comprises a salified amine as promoter (C)], cationic or non-ionic; in particular, they can be one or more polyethoxylated fatty alcohols. Preferably, the surfactants (E) are non-ionic. The role of the surfactant will be especially to refine the particle size of the emulsion and optionally to improve its stability.

The emulsion according to the invention can also contain other formulating additives (I) such as a condensation catalyst for promoting the condensation of the silanols of the salified aminosilane or amino-POS without inhibiting the platinum catalysis (e.g. titanium or zirconium salts or possibly certain tin salts), a bactericide, one or more mineral or organic pigments and one or more organic thickeners (polyethylene oxide, xanthan gum, hydroxyethyl cellulose, acrylic or cationic polymers, etc.) or mineral thickeners (laponite).

Advantageously, the emulsion according to the invention comprises a system for maintaining the pH at alkaline values, for example of between 7 and 8.

This pH maintenance system can be e.g. sodium bicarbonate.

The agent for fixing and maintaining the pH is preferably a buffer system comprising $HCO_3^-/CO_3^{2-}$ and/or $H_2PO_4^-/HPO_4^{2-}$. Thus, to obtain the desired buffer effect, it will be necessary according to the invention to introduce an $HCO_3^-$ and/or $H_2PO_4^-$ salt such as $NaHCO_3$ and/or $Na_2CO_3$ and/or $NaH_2PO_4$ and/or $Na_2HPO_4$. It is self-evident that any other salt with a different counteranion (e.g. K) would be suitable. Particularly preferably, the buffer system used in practice consists of $NaHCO_3$, which is incorporated into the emulsion.

This makes it possible to stabilize the emulsion or the coating or padding bath produced by mixing the emulsions. This provision is described in greater detail in patent application FR-A-2 773 166, the content of which is included in the present disclosure by reference.

Optionally, the emulsion can contain mineral reinforcing or bulking fillers preferably selected from combustion silicas and precipitated silicas. They have a specific surface area, measured by the BET methods, of at least 50 m²/g, especially of between 50 and 400 m²/g and preferably greater than 70 m²/g, a mean primary particle size of less than 0.1 micrometer (μm) and an apparent density of less than 200 g/liter.

These hydrophilic silicas preferably incorporated as such into the (continuous) aqueous phase of the emulsion. In one variant these silicas can optionally be treated with one or more organosilicon compounds normally used for this purpose. In another variant the silicas can be predispersed in silicone oil. These compounds include methylpolysiloxanes such as hexamethyldisiloxane and octamethylcyclotetrasiloxane, methylpolysilazanes such as hexamethyldisilazane and hexamethylcyclotrisilazane, chlorosilanes such as dimethyldichlorosilane, trimethylchlorosilane, methylvinyldichlorosilane and dimethylvinylchlorosilane, and alkoxysilanes such as dimethyldimethoxysilane, dimethylvinylethoxysilane and trimethylmethoxysilane. This treatment can increase the initial weight of the silicas by up to 20%.

It is also possible to use, in addition to or in place of siliceous fillers, other mineral fillers such as calcium carbonates, ground quartz, calcined clays and diatomaceous earths, optionally in the form of an aqueous dispersion (slurry).

As far as non-siliceous mineral materials are concerned, these can be used as semireinforcing or bulking mineral fillers or mineral fillers with specific properties. Examples of these non-siliceous fillers, which can be used by themselves or in a mixture, are carbon black, titanium dioxide, aluminum oxide, hydrated alumina, expanded vermiculite, non-expanded vermiculite, calcium carbonate, zinc oxide, mica, talcum, iron oxide, barium sulfate and slaked lime. These fillers have a particle size generally of between 0.01 and 300 μm and a BET surface area of less than 100 m²/g.

In general it is possible to use from 0.5 to 60% by weight and preferably from 10 to 25% by weight of filler, based on the weight of the silicone phase of the formulation.

The composition of the emulsion according to the invention is e.g. as follows:

100 parts by weight of an α,ω-divinylated POS oil (A) with a vinyl group content of between 2 and 100 meq/100 g;

0 to 150 parts by weight of a dispersion of a reinforcing, semireinforcing and/or bulking filler (J) in water or in an α,ω-divinylated POS oil (in an amount of 10 to 60% of filler in the dispersion);

1 to 7 parts by weight of at least one POS oil (B1) containing ≡SiH such that the ratio of the number of Si—H groups to the number of Si-alkenyl groups ranges from 0.4 to 10 and preferably from 0.6 to 5;

0.2 to 5 parts by weight of an adhesion promoter (C), taken in the dry state;

a polyaddition catalyst (D) composed of at least one metal belonging to the platinum group, in an amount of 2 to 150 ppm of platinum;

0.5 to 10 parts by weight of a surfactant (E);

0 to 100 parts by weight of a POS resin (F);

0 to 1 part by weight of a crosslinking inhibitor (G);
0 to n parts by weight of a pH fixing agent (H), n being such that the pH is maintained between 7 and 8;
0 to m parts by weight of a formulating additive (I);
0 to 150 parts by weight of a dispersion of a reinforcing, semireinforcing and/or bulking filler (J) in an α,ω-divinylated POS oil, in an amount of 10 to 80% of filler in the dispersion;
40 to 2000 parts by weight of water (K) so that the final emulsion or the bath (produced by mixing several emulsions with water) used to treat the fabric has a dry extract of between 5 and 65%.

According to another of its features, the present invention further relates to a process for the preparation of an aqueous POS emulsion as defined above, characterized in that an emulsion is formed by introducing the constituents (A) to (K) into the same reactor, except for the catalyst (D), which is emulsified separately and added when the impregnating bath is made up.

In one preferred modality, applied especially in the case where the special promoter (C) contains at least one protective hydrocolloid such as PVA, the emulsion is obtained by:
    directly preparing at least one pre-emulsion that is non-catalyzing, i.e. devoid of catalyst (D), and at least one pre-emulsion that is catalyzing, i.e. contains catalyst (D), at least one of these pre-emulsions being obtained by bringing at least part of the silicone phase and at least part of the protective hydrocolloid into contact with water,
    and then mixing the catalyzing emulsion(s) with the non-catalyzing pre-emulsion(s) when the impregnating bath is made up.

Preferably, the emulsion is produced by mixing pre-emulsions which are each incapable of crosslinking separately because they do not contain all the reactive species and the catalyst (≡SiVi POS+≡SiH POS+platinum) necessary for the polyaddition. It is possible, for example, to produce an emulsion containing the ≡SiVi, the ≡SiH and the inhibitor (part A) and a catalyzing emulsion based on platinum and ≡SiVi oil (part B), which will be combined when the coating bath is made up.

This greatly facilitates the preparation of a stable emulsion according to the invention which can easily be prepared under industrial conditions. It is possible to envisage using ingredients (A) and/or (B) and/or (C) in the form of pre-emulsions that may or may not contain the other ingredients (D) to (J).

Thus, in one variant:
    the following pre-emulsions are produced:
        (i) a non-catalyzing pre-emulsion as the basis of the POS (A),
        (ii) a non-catalyzing pre-emulsion as the basis of the POS (B) (crosslinking emulsion),
        (iii) a pre-emulsion as the basis of the catalyst (D) (catalyzing emulsion), consisting e.g. of an aqueous emulsion of a platinum catalyst diluted in a vinylated silicone oil;
    these pre-emulsions are mixed, it being possible for one or other of the pre-emulsions (i) to (iii) also to contain the surfactant (E), optionally the POS resin (F), optionally the crosslinking inhibitor (G) and/or optionally the pH fixing agent (H) and/or optionally the formulating additive (I).

Preferably, the catalyzing emulsion is added to the other, non-catalyzing silicone pre-emulsions (especially the one based on SiH) when the bath is formulated, prior to application to the fabric.

In advantageous modalities of the invention:
    when the surfactant (E) is used as the only emulsifier, the emulsion is formed directly or by phase inversion;
    when (all or part of) a PVA (C) is used as the only emulsifier, the emulsion is only formed directly.

Direct emulsification consists in pouring the silicone phase into the aqueous solution containing the surfactant.

Another advantageous modality of the invention can consist in introducing the adhesion promoter (C), especially the salified aminosilane or amino-POS, only when the coating bath is prepared.

Another possibility would be to prepare emulsions A and B or pre-emulsions (i), (ii) and (iii) containing no adhesion promoter, and to make provision for incorporating the latter separately when A and B or (i), (ii) and (iii) are mixed.

The present invention further relates to a process for the preparation of a fibrous substrate coated with at least one layer of elastomers obtained by crosslinking the aqueous POS emulsion as defined above.

This process comprises the following steps:
    a step in which at least one layer of the emulsion as defined above is deposited on said fibrous substrate;
    then a crosslinking step to give a fibrous substrate coated with a layer of elastomer in such a way that the ratio of the dry weight of the coating to the weight of the fibrous substrate is less than 0.2 and preferably between 0.05 and 0.11.

The deposition step is advantageously a coating operation.

The coating step can be carried out especially with a knife, particularly a cylinder knife, an air knife or a belt knife, or by padding, i.e. squeezing between two rolls, or with a sweeping roll, rotating frame or reverse roll, or by transfer or spraying.

It is possible to coat one or both sides of the textile material, the coating of both sides advantageously being carried out by padding after impregnation of the fabric with the emulsion. After passing between the rolls, the fabric is uniformly coated with a thin layer of emulsion. This is followed by drying and crosslinking, preferably by means of hot air or infrared, especially for 30 s to 5 min, at a crosslinking temperature not exceeding the degradation temperature of the substrate.

When only one side is coated, it is preferable to use a knife. The emulsion is deposited continuously on the top side of the fabric and then passes underneath the knife prior to drying and crosslinking as above.

Preferably, coating is carried out by:
    immersion of the fibrous substrate in a bath of emulsion as defined above,
    mechanical drying, preferably by pressing between rolls,
    and then crosslinking, preferably with thermal activation when the crosslinking takes place-according to a polyaddition mechanism.

The layer of elastomer is preferably present in an amount such that the ratio of the dry weight of the coating to the weight of the fibrous substrate is less than 0.2 and preferably between 0.05 and 0.11.

In the case of two-component emulsions, the process comprises a previous step in which the two components are mixed.

The present invention further relates to any product obtainable by depositing the emulsion as defined above on a fibrous substrate—preferably made of glass fibers—after which the POS contained in the emulsion applied to the substrate are crosslinked to an elastomer.

Examples which may be mentioned are inflatable bags used for protecting vehicle occupants, or airbags, glass braiding (glass fabric sheathing for the thermal and dielectric protection of electric wire), conveyor belts, fire-resistant fabrics or thermal insulators, compensators (leaktight flexible sleeves for piping), clothing, or flexible materials for use in interior or exterior textile architecture (tarpaulins, tents, stalls, marquees, etc.).

Examples of possible fibrous substrates to be coated are woven fabrics, nonwovens or knitted fabrics or, more generally, any fibrous substrate comprising fibers, and/or fibers selected from the group of materials comprising glass, silica, metals, ceramic, silicon carbide, carbon, boron, natural fibers such as cotton, wool, hemp or flax, artificial fibers such as viscose or cellulosic fibers, and synthetic fibers such as polyesters, polyamides, polyacrylics, chlorofibers, polyolefins, synthetic rubbers, polyvinyl alcohol, aramides, fluorofibers, phenolics, etc.

Preferred examples of fibrous substrates which may be mentioned are glass fabrics.

Advantageously, these coated glass fabrics have a good tear strength and fraying resistance. Furthermore, they are flexible and are not subject to creasing. Also, their gross calorific value (GCV) is less than or equal to 2500 kJ/kg.

The present invention further relates to the use of an emulsion as defined above, or obtained by the process described above, for coating a fibrous substrate, except for any architectural textile.

"Architectural textile" is understood as meaning a woven fabric or nonwoven and, more generally, any fibrous substrate which, after coating, is intended to be used in the construction of:

shelters, mobile structures, textile buildings, partitions, flexible doors, tarpaulins, tents, stalls or marquees;

furniture, cladding panels, advertising screens, windscreens or filtering panels;

solar protections, ceilings and blinds.

The invention will now be described in greater detail with the aid of non-limiting Examples.

EXAMPLES

Example 1

Preparation of the Emulsions According to the Invention 1.1—Compounds Used:

POS A-1: α,ω PDMS oil having a dynamic viscosity ($\eta_{sd}$) of 60,000 mPa·s at 23° C. and containing 0.073% by weight of Vi POS A-2: hydrogenated POS oil containing $Me_2SiO$ and MeHSiO units, having a viscosity of 25 mPa·s and containing 0.7% by weight of H Surfactant (E)=either Rhodasurf ROX, an 85% aqueous solution of an ethoxylated fatty alcohol marketed by RHODIA, or PVA=a 10% aqueous solution of polyvinyl alcohol 25/140 (viscosity in 4% solution: 25/ester number: 140) of mark RHODOVIOL®

Adhesion promoter (C) and surfactant (E)=PVA

Catalyst (D)=Karstedt platinum diluted in a vinylated POS oil and containing 10% of Pt Resin (F.1)=a 40% solution of resin $MD^{Vi}Q$ in an α,ω PDMS oil having a dynamic viscosity ($\eta_{sd}$) of 60,000 mPa·s at 23° C., the resin solution containing 0.7% by weight of Vi (G)=ECH: ethynylcyclohexanol Compositions by Weight (in g):

| | PART (A1) | PART (A2) | PART (B) (catalyzing emulsion) |
|---|---|---|---|
| POS (A-1) - vinylated oil | 280 | 280 | 106 |
| (G) = ECH | 0.7 | 0.7 | 0 |
| Resin (F.1) | 280 | 280 | 0 |
| Surfactant (E) = Rhodasurf ROX | 35 | — | — |
| (C) + (E) = PVA [Rhodoviol ®: 10% PVA] | — | 162 | 56 |
| POS (A-2) - hydrogenated oil | 25 | 25 | 0 |
| Catalyst (D) containing 10% of Pt | — | — | 0.9 |
| Sorbic acid | 0.225 | 0.225 | 0 |
| 100% sodium bicarbonate | — | — | 1.9 |
| Demineralized water | 409 | 270 | 35 |
| Total | 1030 | 1018 | 200 |
| Properties of the final emulsions | | | |
| Mean particle size (µm) measured on a Coulter LS130 | 0.3 | 2.9 | 2.4 |
| Dry extract (%) (2 g, 1 h at 120° C.) | 59.6 | 59.6 | 60.9 |
| SiH/SiVi (molar ratio) of the bath obtained by mixing 100 parts by weight of emulsion A + 10 parts by weight of catalyzing emulsion B | | 2.07 | |
| pH of the bath produced by mixing 100 parts by weight of emulsion A + 10 parts of catalyzing emulsion B | | between 7 and 8 | |

1.2—Procedure for Preparing the Emulsions:

Part (A1):

The Rhodasurf ROX, 35 g of water and the POS (A-1) oil, in which the inhibitor ECH has been dispersed beforehand, are introduced into an IKA laboratory reactor equipped with a scraping anchor and a base (cooled by cold water circulation). After stirring for 15 min at 80 rpm, a concentrated oil/water emulsion is obtained which has the appearance of a viscous gel.

The resin (F.1) is then poured in over 85 min, with stirring (80 rpm), the final temperature being about 30° C. The mean particle size of the emulsion is then 0.28 µm.

Stirring is continued for 30 min and the POS (A-2) oil (hydrogenated polydimethylsiloxane oil) is then poured in over 15 min; 80 g of water are also poured in.

At this stage the mean particle size of the emulsion, characterized on the Coulter LS130, is 0.29 µm.

The emulsion is diluted by gradually adding the rest of the demineralized water (i.e. 310 g), followed by the sorbic acid, and the final emulsion is transferred to a polyethylene flask.

Part (A2):

The 10% aqueous solution of polyvinyl alcohol (Rhodoviol 25/140) and the sorbic acid are introduced into an IKA laboratory reactor equipped with a scraping anchor and a base (cooled by cold water circulation).

The resin (E.1) is poured in over 170 min, with stirring, the final temperature being about 22° C.

The POS (A-1) oil ($ViMe_2SiO$-blocked polydimethylsiloxane oil having a viscosity of 60,000 mPa·s and containing 0.07% of Vi), in which the ethynylcyclohexanol (ECH) has been predispersed, is then poured in over 150 min, the final temperature reaching 17° C.

At this stage the mean particle size of the emulsion, characterized on the Coulter LS130, is 5.9 µm.

An Ultra-Turrax rotor-stator (IKA) is then introduced and the emulsion is sheared for 1 h 30: 20 min at 16,000 rpm and then for 1 h 10 min at 13,000 rpm.

$T°_{initial}$=22.9° C., $T°_{final}$=28.6° C.

The mean particle size drops to 3 µm.

The POS (A-2) oil (silicone oil containing $Me_2SiO_{2/2}$ and $MeHSiO_{2/2}$ units, having a viscosity of 25 mPa·s and containing 0.7% by weight of H) is poured in over 20 min; T=24.5° C.

The emulsion is diluted by gradually adding demineralized water over 60 min; T°=27.3° C.

Part B:

Emulsion B is produced according to the same protocol as emulsion A2 by pouring the POS-1 oil 621V60000 (in which the catalyst (D) has been predispersed) into the 10% aqueous solution of polyvinyl alcohol. The bicarbonate is added at the end to the diluted emulsion.

Parts A+B:

100 parts of A1 or A2 are mixed with 10 parts of B, optionally together with diluting water to adjust the viscosity and concentration of the bath (so as to regulate the amount of silicone deposited on the fabric), when the coating bath is made up before being applied to the fabric. The pH of the bath is between 7 and 8.

Example 2

Process for Application of the Emulsions of Example 1

By padding (squeezing between two rolls).

The fabric arrives vertically between the rolls where the emulsion is deposited continuously, the fabric being impregnated on both sides as it leaves the rolls. It then passes through an oven for one minute.

The installation operates at 10 m/min. The inlet and outlet temperatures of the ovens are set at 120 and 160° C., respectively. The pressure on the squeezing rolls is in the order of 1.5 bar.

The fabrics are weighed before and after coating in order to measure the weight deposited.

Example 3

Process for Application of the Emulsions of Example 1

This Example is identical to Example 2 except that the pressure on the squeezing rolls is in the order of 1 bar.

The fabrics are weighed before and after coating in order to measure the weight deposited.

Example 4

Process for Application of the Emulsions of Example 1

By padding (squeezing between two rolls).

The fabric is immersed in a trough located upstream from the squeezing rolls and arrives at an angle of 20° between the rolls, which are at a squeezing pressure of 1.5 bars. The fabric then passes through an oven for one minute.

The installation operates at 10 m/min. The inlet and outlet temperatures of the ovens are set at 120 and 160° C., respectively. The fabrics are weighed before and after coating in order to measure the weight deposited.

Example 5

Validation in Application—Properties Obtained with the Mixture of Emulsions A2+B (Without Additive)

5.1 Glass Fabric Weighing 350 g/m$^2$

This fabric is coated by the process of Example 4 with an emulsion of Example 1 (mixture of emulsions A2+B (without additive)).

The dry extract of this bath was adjusted to 55.7% and then to 48%.

Under these conditions 22 g/m$^2$, expressed by dry weight, were deposited.

The coated fabric has an attractive appearance.

The gross calorific value, measured according to NFP92-510, is 1900 kJ/kg.

The fraying resistance is good, as represented by a combing resistance, measured according to DIN54301, of more than 50 N.

5.2 Glass Fabric Weighing 200 g/m$^2$

This fabric is coated by the process of Example 2 with an emulsion of Example 1 (mixture of emulsions A2+B (without additive)).

The dry extract of this bath was adjusted to 55.7% and then to 42%.

Under these conditions 15 g/m$^2$, expressed by dry weight, were deposited.

The coated fabric has an attractive appearance.

The gross calorific value, measured according to NFP92-510, is 2150 kJ/kg.

The fraying resistance is good, as represented by a combing resistance, measured according to DIN54301, of more than 50 N.

The dry extract of this bath was adjusted to 55.7% and then to 42%.

Under these conditions 12 g/m$^2$, expressed by dry weight, were deposited.

The coated fabric has an attractive appearance, particularly on the top side which has received the emulsion.

The gross calorific value, measured according to NFP92-510, is 1800 kJ/kg.

The fraying resistance is good, as represented by a combing resistance, measured according to DIN54301, of more than 50 N.

Example 6

Incorporation of the Salified Aminosilane or the PVA into Emulsion A when the Coating Bath is Made Up Experiments on the addition of adhesion promoters were carried out in order to make the emulsions more adhesive on the glass fiber or synthetic fibers. The water-soluble silanes tested are:

6.1 Comparative Experiment

The promoter is Dynasylan® HS 2926 marketed by Degussa-Sivento, epoxysilane, pH=3, 60% in water:

6.2 Experiment 6.2

Dynasylan® HS 2929 marketed by Degussa-Sivento, condensed and salified acrylic aminosilane, pH=4, 60% in water.

6.3 Experiment 6.3

The promoter is Silquest® VS142 marketed by Witco-OSI, aminosilane, pH=12, about 25% in water, which consists of a silane oligomer described below, partially condensed via its SiOH groups.

This silane was used after salification, which was effected by neutralization of the aqueous solution by adding a sufficient amount of acetic acid to bring its pH to between 6 and 7.

Figure 1:
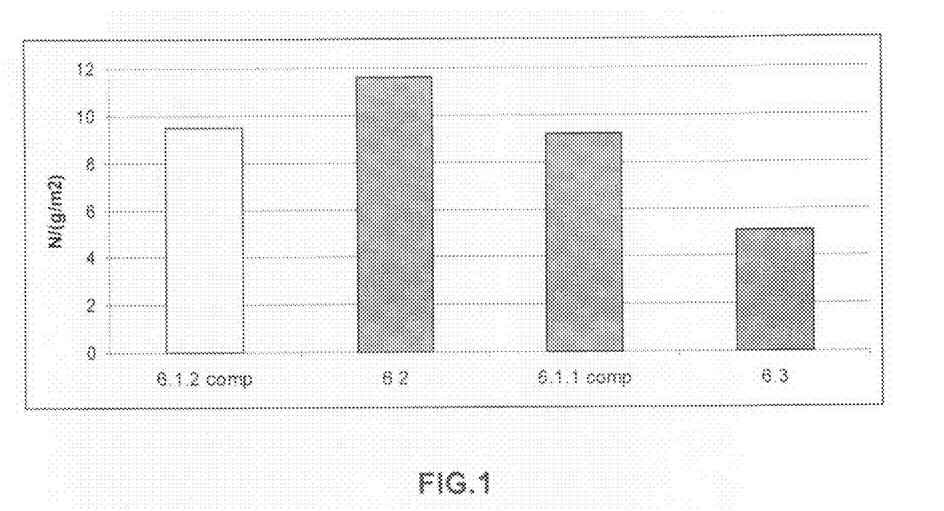
FIG. 1 corresponds to a polyester fabric substrate.
Figure 2:
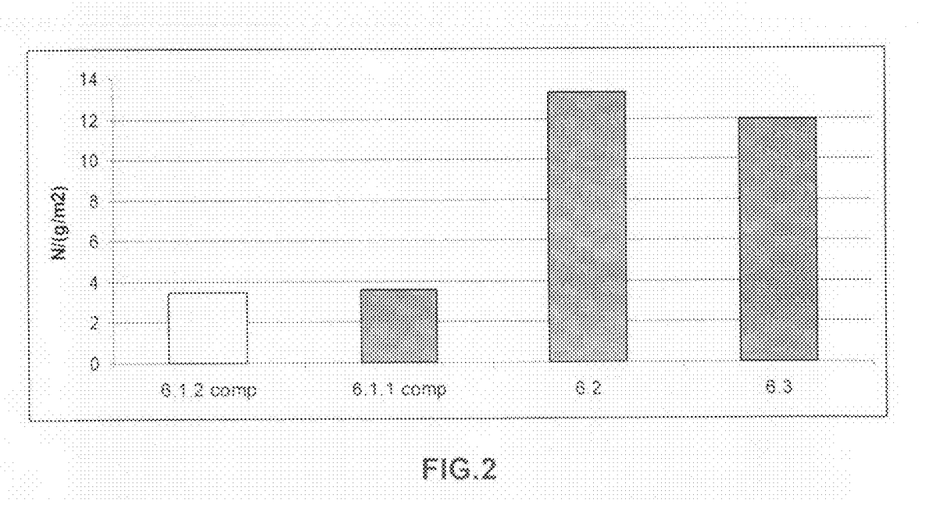
FIG. 2 corresponds to a glass fabric substrate.

These promoters of experiments 6.1, 6.2 and 6.3 are added directly to part A2 of the emulsion of Example 1 in a proportion of 2% (by dry weight of silane, based on the oil) 24 h before the bath (mixture of A2+B) is made up. As soon as the bath has been made up, silk screen fabric coating tests and peel tests are performed according to the attached protocol. The results of adhesion to polyester and to glass fabric of the cloth type, expresser as the peel strength (measured in N/(g/m$^2$) by a 180° peel test described below), are shown in FIGS. 1 and 2 attached.

Note: In both the Figures, the control corresponds to the adhesion results obtained when the fabric is treated with emulsion 1.2 of Example 1 without the incorporation of additional adhesion promoter.

It is pointed out that the salified aminosilanes appreciably improve the adhesion to glass fabric. The salified aminosilane 6.2 also improves the adhesion to polyester fabric.

The 180° peel test on a fibrous substrate is a measure of the adhesion of PA emulsions. The procedure for this test is as follows:

1. Principle

Measurement of the force required to separate 2 strips of substrates coated with the test mixture crosslinked on the fibrous substrates.

2. Reagents

Use of methylene blue to facilitate identification of the superposition of the two coated strips of fabric (not essential for the measurement).

3. Equipment 1 hot-pressing machine: set the platen temperature to 120° C.
2 ovens: one at 80° C. and one at 160° C.
installation for silk screen application (use of a screen of mesh diameter ~200 μm).
1 balance.
1 LHOMARGY® DY 30 tensile tester.

4. Procedure a—Preparation of the Test Pieces

Fabric Substrate Used:

Strips of ~12 by 17 cm are cut out of the fibrous substrate. To facilitate this cutting and avoid fraying, the contours marked out on the fabric are coated with a silicone elastomer that crosslinks rapidly in the cold (CAF). Small amounts of CAF are therefore deposited with a gun and spread along the contours with a spatula. Cutting is easier once the CAF is dry.

Preparation of the Mixture:

10 g of part B to 100 g of part A. ~20 g of mixture are needed to prepare 3 experiments. 1 drop of methylene blue is added to facilitate the superposition of the two coated sides.

b—Application

Using the silk screen method, two 10 cm by 5 strips of the mixture are deposited parallel to one another and ~2 cm apart. The piece of substrate is weighed before and after coating in order to know the amount deposited.

Drying and crosslinking under the press:

5 min at 80° C.,
superposition of the 2 coated sides on top of one another,
5 min under the press at 120° C. (placed between 2 sheets of paper) and at ~2 tonnes,
5 min at 160° C.

Leave to stand at room temperature for ~½ day.

6.4 Application Experiments with Mixtures of Part A1+B, A1+B+Salified VS142, A1+B+PVA:

These impregnations are carried out on a glass fabric substrate (200 g/m$^2$) by padding according to Example 3. The samples are passed through an oven at 150° C. for 2 min. The weights deposited are comparable and representative.

The combing resistance tests are performed in order to determine the ability of the samples to resist fraying.

| Part | Weight deposited | Combing resistance (DIN54301) |
|---|---|---|
| A1 + B | 18-20 | 11 |
| A1 + B + salified VS142 | 18 | 44 |
| A1 + B + 1.8% PVA | 19-20 | 24 |
| A1 + B + 3.6% PVA | 17 | 14 |
| A1 + B + 5.4% PVA | 16-19 | 16 |

It could be observed that the best fraying resistance, as represented by the combing test, was obtained with the composition A1+B+VS142 (presence of the salified aminosilane).

The invention claimed is:

1. Process for increasing the fraying resistance of a fibrous substrate comprising the following steps:
   preparation of an improved aqueous polyorganosiloxane (POS) emulsion, crosslinkable to an elastomer by means of polyaddition reactions, said emulsion comprising:
   (A) at least one POS having at least two unsaturated functional groups of the C$_2$-C$_6$ alkenyl type bonded to the silicon in each molecule, (B) at least one POS having at least three hydrogen atoms bonded to the silicon in each molecule,
(C) at least one special adhesion promoter,
(D) at least one catalyst,
(E) at least one surfactant,
(F) optionally at least one POS resin containing at least two alkenyl groups,
(G) optionally at least one crosslinking inhibitor,
(H) optionally at least one pH fixing agent,
(I) optionally at least one formulating additive,
(J) optionally a filler,
(K) and water,
the improvement consisting in:
selecting the adhesion promoter (C) from the group consisting of hydroxylated silanes and POS, either of which carries at least one hydroxyl group and at least one salified amino group per molecule,
selecting a percentage by weight of the adhesion promoter (C), based on the silicone phase, such that $$0.05 \leq (C) \leq 4.0$$

deposition on said fibrous substrate of at least one layer of the aqueous polyorganosiloxane (POS) emulsion;
crosslinking to give a fibrous substrate coated with a layer of elastomer in such a way that the ratio of the dry weight of the coating to the weight of the fibrous substrate is less than 0.2.

2. Process according to claim 1, wherein the aqueous polyorganosiloxane (POS) emulsion is devoid of:
substantially linear, vinylated polydiorganosiloxane copolymer(s) of the random type, blocked at each end of its polymer chain by vinyldiorganosiloxy or triorganosiloxy groups and containing at least three SiVi groups per molecule,
and/or said emulsion does not comprise vinylated which R is a $C_1$-$C_4$ alkyl radical, a phenyl radical or a 3,3,3-trifluoropropyl radical, in an amount such that 0.5 to 60% of the number of vinyl groups in the emulsion consist of said vinylated cyclotrisiloxane,
and/or said emulsion is devoid of sodium laurylsulfate.

3. Process according to claim 1, wherein the ratio of the amount by weight of adhesion promoter (C) to the surface area of the substrate ranges from 0.1 to 10 mg/m$^2$.

4. Process according to claim 1, wherein the surfactant (E) at least partially comprises PVA.

5. Process according to claim 1, wherein the salified amino-POS constituting the promoter (C) is formed of several repeat units of average formula (I) below:

in which:
$R^1$ is a monovalent group devoid of nitrogen whose nature is identical or different from one repeat unit to the next and which is a $C_1$-$C_6$ alkyl, an aryl, a $C_2$-$C_8$ alkenyl or an acrylate, each of these groups optionally being substituted;
$R^2$ is of an identical or different nature from one repeat unit to the next and has the following formula:

$R^4$ being an optionally substituted $C_1$-$C_{10}$ hydrocarbon radical, the groups $R^5$ and $R^6$ being identical or different and representing hydrogen, an optionally substituted $C_1$-$C_{10}$ hydrocarbon radical or —$R^4$—$NH_3^{(+)}.X^{(-)}$,
or the groups $R^5$ and $R^6$ being different from hydrogen and together forming a 5- to 7-membered ring containing at least one heteroatom,
and X being a counteranion selected from carboxylates and halides;
x, y and z are positive integers or decimal numbers below 4; and x+y+z<4.

6. Process according to claim 5, wherein the salified amino-POS is a resin having a mean silicon functionality greater than 2, corresponding to x+y<2.

7. Process according to claim 1, wherein the aqueous polyorganosiloxane (POS) emulsion comprises:
100 parts by weight of an α,ω-divinylated POS oil (A) with a vinyl group content of between 2 and 100 meq/100 g;
0 to 150 parts by weight of a dispersion of a reinforcing, semireinforcing and/or bulking filler (J) in water or in an α,ω-divinylated POS oil (in an amount of 10 to 60% of filler in the dispersion);
1 to 7 parts by weight of at least one POS oil (B1) containing ≡SiH such that the ratio of the number of Si—H groups to the number of Si-alkenyl groups ranges from 0.4 to 10;
0.2 to 5 parts by weight of an adhesion promoter (C), taken in the dry state;
a polyaddition catalyst (D) composed of at least one metal belonging to the platinum group, in an amount of 2 to 150 ppm of platinum;
0.5 to 10 parts by weight of a surfactant (E);
0 to 100 parts by weight of a POS resin (F);
0 to 1 part by weight of a crosslinking inhibitor (G);
0 to n parts by weight of a pH fixing agent (H), n being such that the pH is maintained between 7 and 8;
0 to m parts by weight of a formulating additive (I);
0 to 150 parts by weight of a dispersion of a reinforcing, semireinforcing and/or bulking filler (J) in an α,ω-divinylated POS oil, in an amount of 10 to 80% of filler in the dispersion;
40 to 2000 parts by weight of water (K) so that the final emulsion or the bath (produced by mixing several emulsions with water) used to treat the fabric has a dry extract of between 5 and 65%.

8. Process according to claim 1, wherein the preparation of an emulsion is made by introducing the constituents (A) to (K) into the same reactor, except for the catalyst (D), which is emulsified separately and added when an impregnating bath is made up.

9. Process according to claim 8, wherein:
the following pre-emulsions are produced:
(i) a pre-emulsion of the POS (A),
(ii) a pre-emulsion of the POS (B) (crosslinking emulsion),
(iii) a pre-emulsion of the catalyst (D) (catalyzing emulsion), comprising an aqueous emulsion of a type g platinum catalyst prediluted in a vinylated silicone oil;
these pre-emulsions are mixed, it being possible for one or other of the pre-emulsions (i) to (iii) also to contain the surfactant (E), optionally the POS resin (F), optionally the crosslinking inhibitor (G) and/or optionally the pH fixing agent (H) and/or optionally the formulating additive (I), the catalyzing emulsion being added when the impregnating bath is formulated.

10. Process according to claim 8, wherein:

the surfactant (E) is used as the only emulsifier and the emulsion is formed directly or by phase inversion.

11. Process according to claim 1, wherein the preparation of an emulsion is made by introducing the constituents (A) to (K) into the same reactor, except for the adhesion promoter (C), which is added when an impregnating bath is made up.

12. Process according to claim 3, wherein the ratio of the amount by weight of adhesion promoter (C) to the surface area of the substrate ranges from 0.2 to 5 mg/m$^2$.

13. Process according to claim 6, wherein x is <2.

14. Process according to claim 13, wherein x is $0.1 \leq x \leq 1$.

15. Process according to claim 6, wherein y is <1.2.

16. Process according to claim 15, wherein y is $0.1 \leq y \leq 1.1$.

17. Process according to claim 7, wherein the ratio of the number of Si—H groups to the number of Si-alkenyl groups of said POS oil (B1) ranges from 0.6 to 5.

18. Process according to claim 5, wherein said heteroatom is nitrogen or oxygen.

* * * * *